United States Patent
Deng

(10) Patent No.: US 11,363,129 B2
(45) Date of Patent: *Jun. 14, 2022

(54) METHOD AND APPARATUS FOR PROCESSING CONTACT INFORMATION USING A WIRELESS TERMINAL

(71) Applicant: Huawei Device Co., Ltd., Guangdong (CN)

(72) Inventor: Junjie Deng, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,060

(22) Filed: Apr. 1, 2020

(65) Prior Publication Data

US 2020/0296204 A1    Sep. 17, 2020

Related U.S. Application Data

(63) Continuation of application No. 16/299,658, filed on Mar. 12, 2019, now Pat. No. 10,623,551, which is a (Continued)

(30) Foreign Application Priority Data

Aug. 19, 2009   (CN) .......................... 200910166470.4

(51) Int. Cl.
*H04W 4/12*       (2009.01)
*H04M 1/7243*     (2021.01)
(Continued)

(52) U.S. Cl.
CPC ...... *H04M 1/7243* (2021.01); *G06Q 30/0641* (2013.01); *H04L 51/28* (2013.01);
(Continued)

(58) Field of Classification Search
CPC .......... H04W 4/12; H04W 4/14; H04W 4/16; H04W 4/18; H04W 4/185; H04W 88/02;
(Continued)

(56) References Cited

U.S. PATENT DOCUMENTS 6,415,318 B1 *  7/2002  Aggarwal ............ G06Q 10/107
                                                    370/230
6,549,937 B1 *  4/2003  Auerbach ............... H04L 29/06
                                                    709/206
(Continued)

FOREIGN PATENT DOCUMENTS

CN          1779705 A       5/2006
CN        101197727 A       6/2008
(Continued)

*Primary Examiner* — Jean A Gelin
(74) *Attorney, Agent, or Firm* — Conley Rose, P.C.

(57) ABSTRACT

A method for processing contact information includes displaying a list of contacts on a display of a wireless terminal, determining a first contact from the list of contacts in response to a selection of a user, obtaining a web log address and an online shop address of the first contact, obtaining, from a network service, a first content corresponding to the web log address and the online shop address of the first contact, and displaying the first content on a first area of the display, where the first content is dynamically updated.

33 Claims, 3 Drawing Sheets

Related U.S. Application Data continuation of application No. 15/923,115, filed on Mar. 16, 2018, now Pat. No. 10,257,339, which is a continuation of application No. 15/599,586, filed on May 19, 2017, now Pat. No. 9,942,383, which is a continuation of application No. 14/884,265, filed on Oct. 15, 2015, now Pat. No. 9,667,771, which is a continuation of application No. 14/519,420, filed on Oct. 21, 2014, now Pat. No. 9,191,487, which is a continuation of application No. 12/856,150, filed on Aug. 13, 2010, now Pat. No. 8,892,167.

(51) Int. Cl.

| | |
|---|---|
| *H04L 51/48* | (2022.01) |
| *H04M 1/2757* | (2020.01) |
| *H04M 1/72436* | (2021.01) |
| *H04M 1/72445* | (2021.01) |
| *G06Q 30/06* | (2012.01) |
| *H04W 4/16* | (2009.01) |
| *H04M 1/57* | (2006.01) |
| *H04L 51/58* | (2022.01) |
| *H04M 1/27475* | (2020.01) |
| *H04W 88/02* | (2009.01) |

(52) U.S. Cl.
CPC ......... *H04M 1/2757* (2020.01); *H04M 1/575* (2013.01); *H04M 1/72436* (2021.01); *H04M 1/72445* (2021.01); *H04W 4/16* (2013.01); *H04L 51/38* (2013.01); *H04M 1/27475* (2020.01); *H04M 1/576* (2013.01); *H04M 2250/60* (2013.01); *H04W 4/12* (2013.01); *H04W 88/02* (2013.01)

(58) Field of Classification Search
CPC ........... H04M 1/72547; H04M 1/2757; H04M 1/575; H04M 1/72561; H04M 1/72552; H04M 1/27475; H04M 2250/60; H04L 51/28; H04L 51/38
See application file for complete search history.

(56) References Cited

U.S. PATENT DOCUMENTS

| | | | |
|---|---|---|---|
| 7,340,518 B1 | 3/2008 | Jenkins | |
| 7,395,319 B2 | 7/2008 | Harris et al. | |
| 8,000,726 B2 | 8/2011 | Altman et al. | |
| 8,089,943 B2 | 1/2012 | Lim | |
| 8,095,119 B2 | 1/2012 | Sabotta et al. | |
| 8,106,856 B2 | 1/2012 | Matas et al. | |
| 8,106,887 B2 | 1/2012 | Park et al. | |
| 8,140,058 B2 | 3/2012 | Park | |
| 8,583,175 B2 | 11/2013 | Haitani et al. | |
| 8,600,446 B2 | 12/2013 | Chiang et al. | |
| 2003/0013483 A1 | 1/2003 | Ausems et al. | |
| 2003/0126122 A1* | 7/2003 | Bosley | G06F 16/1834 |
| 2004/0017376 A1 | 1/2004 | Tagliabue et al. | |
| 2004/0116118 A1* | 6/2004 | Karaoguz | H04N 21/6125 455/432.3 |
| 2004/0235520 A1 | 11/2004 | Cadiz et al. | |
| 2005/0289180 A1 | 12/2005 | Pabla et al. | |
| 2006/0035632 A1* | 2/2006 | Sorvari | H04M 1/72436 455/418 |
| 2006/0135142 A1 | 6/2006 | Repka | |
| 2006/0271870 A1* | 11/2006 | Anwar | G06F 3/0481 715/764 |
| 2007/0054661 A1 | 3/2007 | Park et al. | |
| 2007/0112964 A1* | 5/2007 | Guedalia | H04L 65/1006 709/227 |
| 2007/0150544 A1 | 6/2007 | Jachner | |
| 2007/0168529 A1 | 7/2007 | Taylor et al. | |
| 2007/0238472 A1* | 10/2007 | Wanless | H04M 7/128 455/461 |
| 2007/0249327 A1 | 10/2007 | Nurmi | |
| 2008/0005263 A1* | 1/2008 | Baraev | H04L 67/2823 709/217 |
| 2008/0080526 A1* | 4/2008 | Gounares | H04L 41/50 370/401 |
| 2008/0085700 A1 | 4/2008 | Arora | |
| 2008/0133580 A1 | 6/2008 | Wanless et al. | |
| 2008/0234006 A1 | 9/2008 | Lee et al. | |
| 2009/0147771 A1 | 6/2009 | Seal et al. | |
| 2009/0157513 A1 | 6/2009 | Bonev et al. | |
| 2009/0163141 A1 | 6/2009 | Chae | |
| 2009/0239588 A1 | 9/2009 | Nam | |
| 2009/0305682 A1 | 12/2009 | Spalink | |
| 2009/0327918 A1* | 12/2009 | Aaron | H04L 1/0009 715/751 |
| 2010/0250685 A1 | 9/2010 | Kunz et al. | |
| 2010/0262928 A1 | 10/2010 | Abbott | |
| 2010/0274792 A1* | 10/2010 | Bhangi | H04M 1/2746 707/754 |
| 2010/0279764 A1* | 11/2010 | Allen | G07F 17/32 463/25 |
| 2011/0045850 A1 | 2/2011 | Deng | |
| 2011/0238758 A1 | 9/2011 | Liang et al. | |

FOREIGN PATENT DOCUMENTS

| | | |
|---|---|---|
| CN | 201167395 Y | 12/2008 |
| CN | 101345941 A | 1/2009 |
| CN | 101425093 A | 5/2009 |
| CN | 101645856 A | 2/2010 |
| CN | 101188827 A | 9/2011 |
| EP | 1239392 A2 | 9/2002 |
| WO | 2011020415 A1 | 2/2011 |

* cited by examiner

METHOD AND APPARATUS FOR PROCESSING CONTACT INFORMATION USING A WIRELESS TERMINAL

CROSS-REFERENCE TO RELATED APPLICATIONS

This application is a continuation of U.S. patent application Ser. No. 16/299,658 filed on Mar. 12, 2019, which is a continuation of U.S. patent application Ser. No. 15/923,115 filed on Mar. 16, 2018, now U.S. Pat. No. 10,257,339, which is a continuation of U.S. patent application Ser. No. 15/599,586 filed on May 19, 2017, now U.S. Pat. No. 9,942,383, which is a continuation of U.S. patent application Ser. No. 14/884,265 filed on Oct. 15, 2015, now U.S. Pat. No. 9,667,771, which is a continuation of U.S. patent application Ser. No. 14/519,420 filed on Oct. 21, 2014, now U.S. Pat. No. 9,191,487, which is a continuation of U.S. patent application Ser. No. 12/856,150 filed on Aug. 13, 2010, now U.S. Pat. No. 8,892,167, which claims priority to Chinese Patent Application No. 200910166470.4 filed on Aug. 19, 2009. All of the aforementioned patent applications are hereby incorporated by reference in their entireties.

TECHNICAL FIELD

The present disclosure relates to communications technology, and in particular embodiments, to a method and apparatus for processing contact information using a wireless terminal.

BACKGROUND

With richer web content, the network has become one of the main ways for people to obtain information and express themselves. For example, people may write articles through a blog, upload and present photos in a web album, and update their personalized signature, feeling or image using QQ and MSN. (Tencent QQ also referred to as QQ, is a popular free instant messaging computer program in China, MSN (originally the MICROSOFT Network) is a collection of Internet sites and services provided by MICROSOFT.) Using services such as these, friends can know the current living state of the users according to such web information. In addition, people may operate an online shop at Taobao.com to sell commodities such that other people may log in to the online shop to check for new commodities.

When people want to know whether the QQ signature of a concerned contact is changed, they have to log in to QQ, when people want to check whether they receive an electronic mail (Email) from a concerned contact, they have to log in to the Email box.

During the implementation of the present disclosure, the inventor finds at least the following problems. When people want to obtain information about concerned contacts, they have to use different ways, for example, logging in to the QQ or Email box. Thus, this operation process is complicated and not real-time. Thus, there is a need to solve the problem of how to obtain information about concerned contacts easily and quickly.

SUMMARY

Embodiments of the present disclosure provide a wireless terminal and a method for processing contact information performed by a wireless terminal.

In one embodiment of the present disclosure, there is provided a wireless terminal, including a display, one or more processors, and a memory storing programming for execution by the one or more processors, the programming including instructions for displaying a list of contacts on a display of the wireless terminal, determining a first contact from the list of contacts in response to a selection by a user, determining a second contact from the list of contacts in response to another selection by the user, obtaining a web log address and an online shop address of the first contact, obtaining another web log address and another online shop address of the second contact, obtaining, from a network service, a first content corresponding to the web log address and the online shop address of the first contact, obtaining, from the network service, a second content corresponding to the other web log address and the other online shop address of the second contact, displaying the first content on a first area of the display, the first content being dynamically updated, and displaying the second content on a second area of the display, the second content being dynamically updated, wherein the first area of the display is different from the second area of the display.

In another embodiment of the present disclosure, there is provided a method for processing contact information performed by a wireless terminal, the method including displaying a list of contacts on a display of the wireless terminal, determining a first contact from the list of contacts in response to a selection by a user, obtaining a web log address and an online shop address of the first contact, obtaining, from a network service, a first content corresponding to the web log address and the online shop address of the first contact, and displaying the first content on a first area of the display, the first content being dynamically updated.

In yet another embodiment of the present disclosure, there is provided a wireless terminal, including a display, one or more processors, and a memory storing programming for execution by the one or more processors, the programming including instructions for displaying a list of contacts on a display of the wireless terminal, determining a first contact from the list of contacts in response to a selection by a user, obtaining a web log address and an online shop address of the first contact, obtaining, from a network service, a first content corresponding to the web log address and the online shop address of the first contact, and displaying the first content on a first area of the display, the first content being dynamically updated.

In yet another embodiment of the present disclosure, there is provided a non-transitory computer-readable storage medium storing programming for execution by one or more processors, the programming including instructions for displaying a list of contacts on a display of the wireless terminal, determining a first contact from the list of contacts in response to a selection by a user, obtaining a web log address and an online shop address of the first contact, obtaining, from a network service, a first content corresponding to the web log address and the online shop address of the first contact, and displaying the first content on a first area of the display, the first content being dynamically updated.

In at least some embodiments of the present disclosure, the obtained service information may be displayed on an area of the display of the wireless terminal so that the user can easily and quickly read the information about the concerned contact on the display.

DETAILED DESCRIPTION OF ILLUSTRATIVE EMBODIMENTS

Embodiments of the present disclosure are hereinafter described in detail with reference to the accompanying drawings. It is evident that the embodiments are only exemplary embodiments of the present disclosure and the present disclosure is not limited to such embodiments. Other embodiments that those skilled in the art could obtain based on the disclosed embodiments of the present disclosure also fall within the protected scope of the present disclosure.

Figure 1:
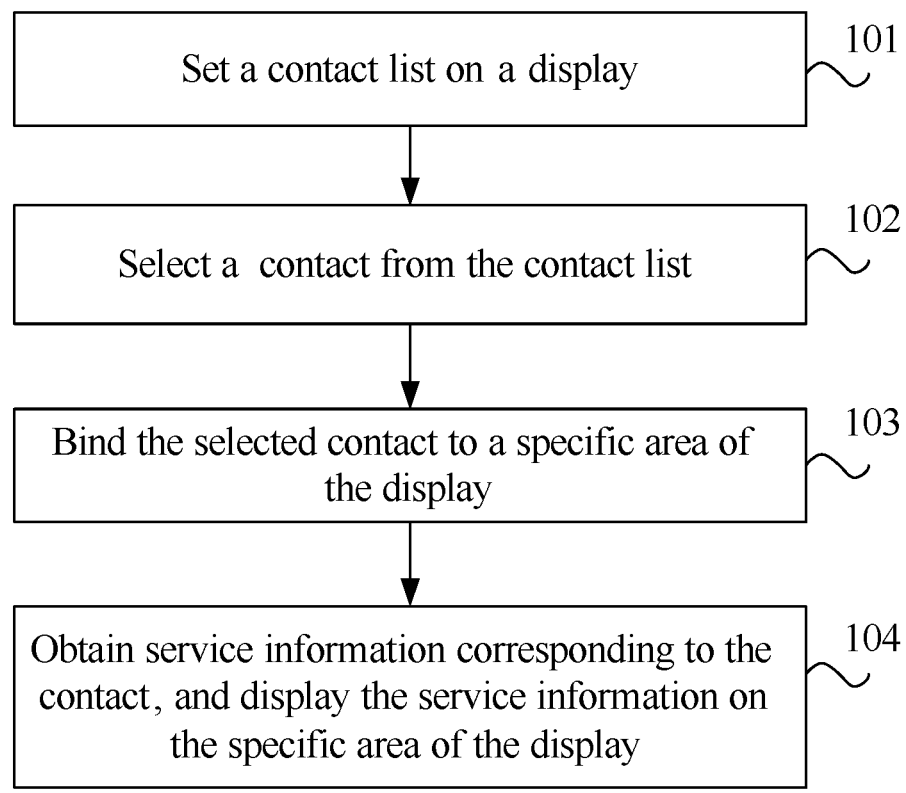
FIG. 1 is a flowchart of a method for processing contact information according an embodiment of to the present disclosure.

FIG. 1 is a flowchart of a method for processing contact information according to an embodiment of the present disclosure. As shown in FIG. 1, the method includes the following steps.

Step 101: Set a contact list on a display. For example, a wireless terminal user may set the contact list on the display of the wireless terminal according to actual needs such that it is convenient to perform related operations on the contacts in the contact list.

Step 102: Select a contact from the contact list. When the wireless terminal user wants to bind one or more contacts to a specific area of the display on the wireless terminal, the wireless terminal user may select the contact from the contact list.

Step 103: Bind the selected contact to a specific area of the display. For example, the wireless terminal may bind the selected contact to the specific area of the display on the wireless terminal such that different service information corresponding to the contact may be displayed on the specific area of the display. In this embodiment, the wireless terminal may be a cell phone, and the contact is not limited to the information such as the mobile communication number of the contact and may include all information about the contact. In actual applications, the cell phone user may select a contact as a concerned contact, and then bind the contact to the specific area of the display. In this way, all information about the contact is displayed on the specific area of the display.

It should be noted that, this embodiment is not limited to the case that only one contact is bound to one specific area of the display. According to actual needs, multiple contacts may also be bound to multiple specific areas of the display on a one-to-one basis, or multiple contacts may be bound to one specific area of the display. The size and arrangement of the specific area of the display may be determined according to actual needs.

Step 104: Obtain service information corresponding to the selected contact, and display the service information on the specific area of the display. After the wireless terminal binds the selected contact to the specific area of the display, the wireless terminal may obtain service information corresponding to the contact. In this embodiment, a cell phone may be used to obtain and store the service information about the contact stored on the cell phone. For example, the contact may be a mobile communication number of the contact, and service information about the contact may be short message service (SMS) information or Multimedia Messaging Service (MMS) information. The cell phone may receive a piece of SMS information, and then compare or match the sender information carried in the SMS information (for example, the mobile communication number of the sender) with the contact bound to the specific area of the display. If the comparison or matching succeeds, the cell phone can know that the received SMS information is sent from a concerned contact of the user. Thus, the cell phone can display the SMS information on the specific area of the display bound to the contact.

It is understood that the cell phone may also receive a piece of MMS information and display pictures or animations in the MMS information on the bound specific area of the display. In another example, the contact may be an MSN number. Thus, the cell phone may automatically search the background for dynamically updated information such as the personalized signature and image corresponding to the MSN number on a timed basis, for example, every half an hour.

Using the method provided in this embodiment, contact is set on the display to form a contact list, contact is selected from the contact list and bound to a specific area of a display such that different information about the contact can be displayed on the specific area of the display, the wireless terminal obtains service information corresponding to the contact such that the user can obtain information about the concerned contact in time using the wireless terminal, the obtained service information is displayed on the specific area of the display such that the user can easily and quickly read the information about the concerned contact on the specific area of the display on the wireless terminal.

In another embodiment of the method for processing contact information, the contact includes at least one contact. That is, at least one contact is bound to the specific area of the display. All the service information about the contacts bound to the contact may be displayed on the specific area of the display.

In another embodiment of the method for processing contact information, the contact includes a mobile communication number of the contact and at least one of an instant communication number, a web log address, an Email address, and an online shop address corresponding to the mobile communication number of the contact.

When the contact includes the mobile communication number, the step of obtaining service information corresponding to the contact and displaying the service information on the specific area of the display may include receiving a piece of SMS information or a piece of MMS information, matching the mobile terminal identifier of the sender carried in the SMS information or the MMS information with the mobile communication number. The SMS information or the MMS information can be displayed on the specific area of the display if the matching succeeds.

When the contact includes the Email address of the contact, the step of obtaining the service information corresponding to the contact and displaying the service information on the specific area of the display may include receiving a piece of Email information, matching the Email identifier of the sender carried in the Email information with the Email address information. The Email information can be displayed on the specific area of the display if the matching succeeds.

When the contact includes the instant communication number, the web log address, and the online shop address, the step of obtaining the service information corresponding to the contact and displaying the service information on the specific area of the display may include obtaining the dynamically updated information corresponding to the instant communication number, the web log address, and the online shop address. The dynamically updated information can be displayed on the specific area of the display.

Further, obtaining the dynamically updated information corresponding to the instant communication number, the web log address, and the online shop address may include logging in to a website corresponding to the instant communication number, the web log address, and the online shop address periodically. The dynamically updated information corresponding to the instant communication number, the web log address, and the online shop address can then be obtained.

The following describes the method for processing contact information in detail with reference to specific embodiments.

Figure 2:
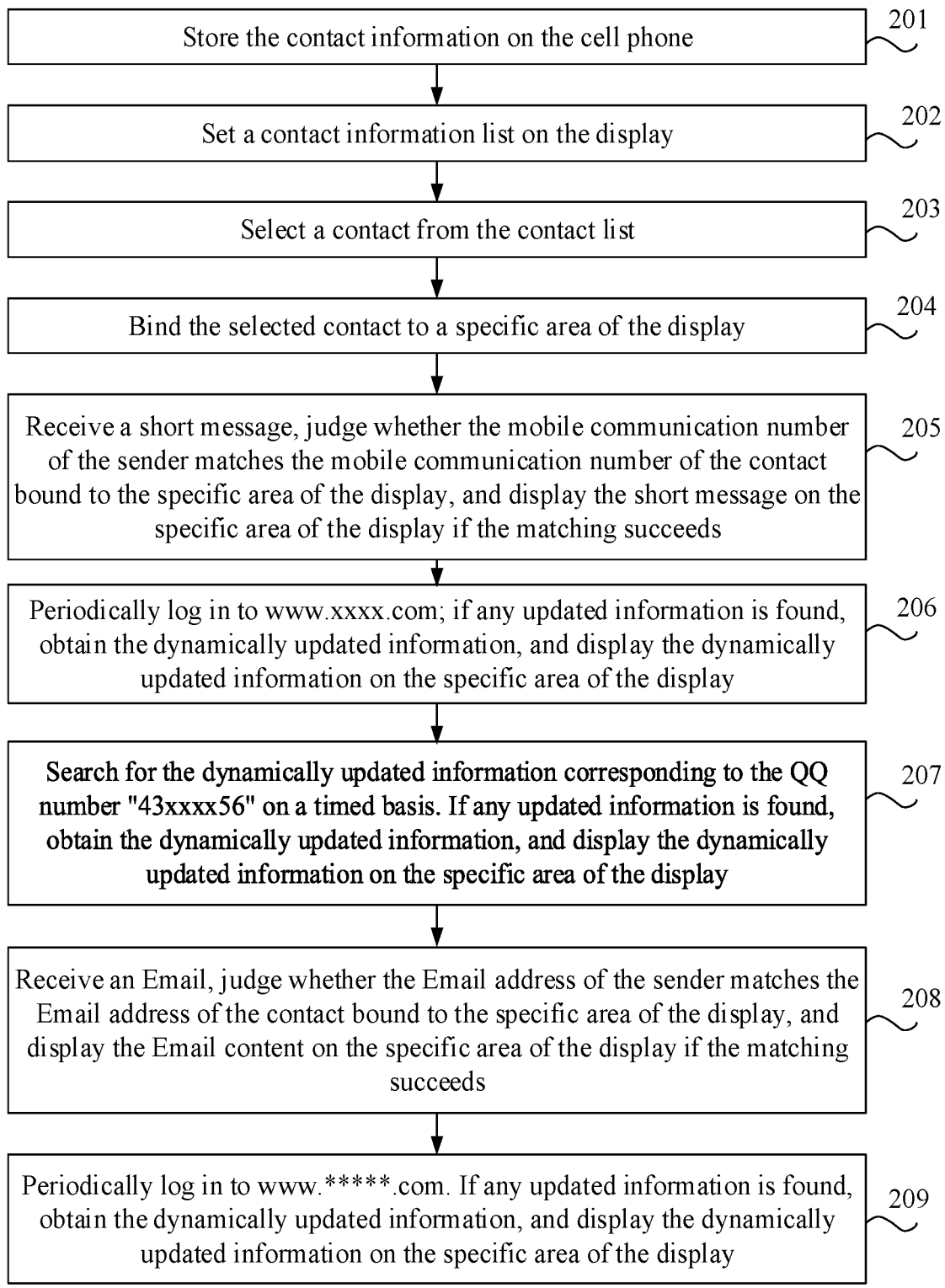
FIG. 2 is a flowchart of the method for processing contact information according to another embodiment of the present disclosure.

FIG. 2 is a flowchart of a method for processing contact information according to another embodiment of the present disclosure. In this embodiment, the wireless terminal may be a cell phone, and the contact may be stored on the cell phone. As shown in FIG. 2, the method includes the following steps.

Step 201: Store the contact on the cell phone. The contact is not limited to the cell phone number and may include all the information about the contact. In this embodiment, it is assumed that the following contact is stored on the cell phone: Name: John Smith, mobile communication number: 1212xxx9458, web log address: www.xxxx.com, QQ number: 43xxxx56, Email address: xxxx@sohu.com, online shop address: www.*****.com.

Step 202: Set a contact list on the display. The cell phone user may set the contact of concerned contacts in the contact stored on the cell phone on the display of the cell phone to form a contact list. In this way, when it is necessary to bind the contact to the specific area of the display, the contact may be easily and quickly selected.

Step 203: Select a contact from the contact list.

Step 204: Bind the selected contact to the specific area of the display. For example, the cell phone user may regard John Smith as a concerned contact, and then bind the contact to the specific area of the display such that all the information about the contact is displayed on the specific area of the display, for example, whether the web log of John Smith is updated, whether short messages are received from John Smith, whether the QQ signature of John Smith is updated, or whether the image of John Smith is updated.

Step 205: Receive a short message, judge whether the mobile communication number of the sender matches the mobile communication number of the contact bound to the specific area of the display, and display the short message on the specific area of the display if the matching succeeds.

When the cell phone receives a short message, the cell phone extracts the mobile communication number of the sender sending the short message, and matches the mobile communication number of the sender with the mobile communication number 1212xxx9458 of John Smith, if the matching succeeds, the cell phone can know that the short message is sent from a concerned contact of the user, and then display the content of the short message on the specific area of the display bound to John Smith.

In step 205, a multimedia message may also be received. When the cell phone receives a multimedia message, the cell phone matches the mobile communication number of the sender sending the multimedia message with the mobile communication number of the contact bound to the specific area of the display, if the matching succeeds, the cell phone can know that the multimedia message is sent from a concerned contact of the user, and then display the content of the multimedia message such as pictures and animations on the specific area of the display bound to John Smith.

Step 206: Periodically log in to www.xxxx.com. If any updated information is found, obtain the dynamically updated information, and display the dynamically updated information on the specific area of the display.

For example, the cell phone logs in to www.xxxx.com on the background every half an hour to know whether the Blog of John Smith is updated. If the Blog is updated, the cell phone may obtain the dynamically updated information, and display the dynamically updated information on the specific area of the display bound to John Smith. Thus, the user may obtain the updated Blog content of John Smith on the specific area of the display.

Step 207: Search for the dynamically updated information corresponding to the QQ number "43xxxx56" on a timed basis. If any updated information is found, obtain the dynamically updated information, and display the dynamically updated information on the specific area of the display.

For example, the cell phone searches every half an hour the background for information about whether the QQ number is updated, for example, whether the personalized signature is updated, whether new logs or new photos are updated on the QQ zone, and whether the QQ image is updated, if any updated information is found, the cell phone obtains the dynamically updated information, and displays the dynamically updated information on the specific area of the display bound to John Smith.

Step 208: Receive an Email, judge whether the Email address of the sender matches the Email address of the contact bound to the specific area of the display, and display the Email content on the specific area of the display if the matching succeeds.

For example, the cell phone may extract the Email address of the sender sending the Email from the Email, and then match the Email address of the sender with the Email address xxxx@sohu.com of John Smith. If the matching succeeds, the cell phone may know that the Email is sent from a concerned contact of the user, and then display the Email content on the specific area of the display bound to John Smith.

Step 209: Periodically log in to www.***.com. If any updated information is found, obtain the dynamically updated information, and display the dynamically updated information on the specific area of the display. For example, the cell phone logs in to www.***.com on the background every half an hour to check whether new commodities are available on the online shop, whether any discount information is available, or whether new comments are added. If any updated information is found, the cell phone may obtain the dynamically updated information, and display the dynamically updated information on the specific area of the display bound to John Smith. Thus, the user may obtain the updated information about the online shop of John Smith on the specific area of the display.

It should be noted that the preceding step 205 to step 209 may be executed in any sequence.

Using the method provided in this embodiment, the contact is set on the display to form a contact list. A contact is selected from the contact list and bound to the specific area of the display such that different information about the contact can be displayed on the specific area of the display. The wireless terminal actively obtains service information corresponding to the contact such that the user can obtain information about the concerned contact in time using the wireless terminal, for example, whether a short message is received from the contact, whether the Blog of the contact is updated, and whether new commodities are available on the online shop of the contact. The obtained service information is displayed on the specific area of the display such that the user can easily and quickly read the information about the concerned contact on the specific area of the display on the wireless terminal.

Figure 3:
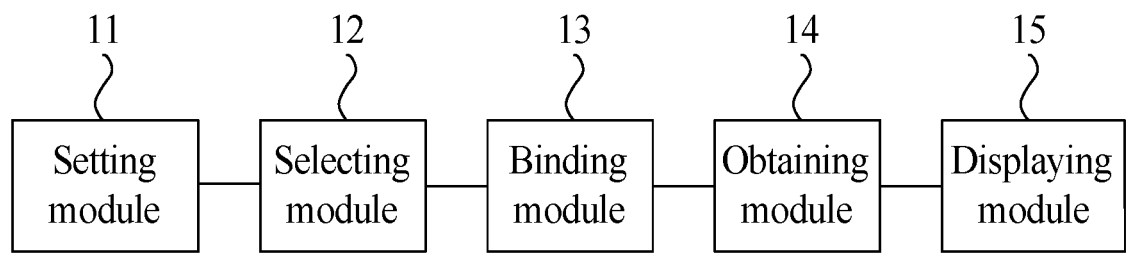
FIG. 3 shows a structure of a wireless terminal according to an embodiment of the present disclosure.

FIG. 3 shows a structure of a wireless terminal according to an embodiment of the present disclosure. As shown in FIG. 3, the wireless terminal includes a setting module 11, a selecting module 12, a binding module 13, an obtaining module 14, and a displaying module 15. The setting module 11 is configured to set a contact list on a display. The selecting module 12 is configured to select a contact from the contact list set by the setting module 11. The binding module 13 is configured to bind the contact selected by the selecting module 12 to the specific area of the display. The obtaining module 14 is configured to obtain service information corresponding to the selected contact bound to the binding module 13. The displaying module 15 is configured to display the service information obtained by the obtaining module 14 on the specific area of the display.

The principle for implementing the wireless terminal provided in this embodiment is the same as that for implementing the method for processing contact information shown in FIG. 1, and is not further described.

Using the wireless terminal in this embodiment, the contact is set on the display to form a contact list. A contact is selected from the contact list and bound to a specific area of the display such that different information about the contact can be displayed on the specific area of the display. The obtaining module 14 actively obtains the service information corresponding to the selected contact such that the user can obtain information about the concerned contact in time using the wireless terminal. The obtained service information is displayed on the specific area of the display such that the user can easily and quickly read the information about the concerned contact on the specific area of the display using the displaying module.

Figure 4:
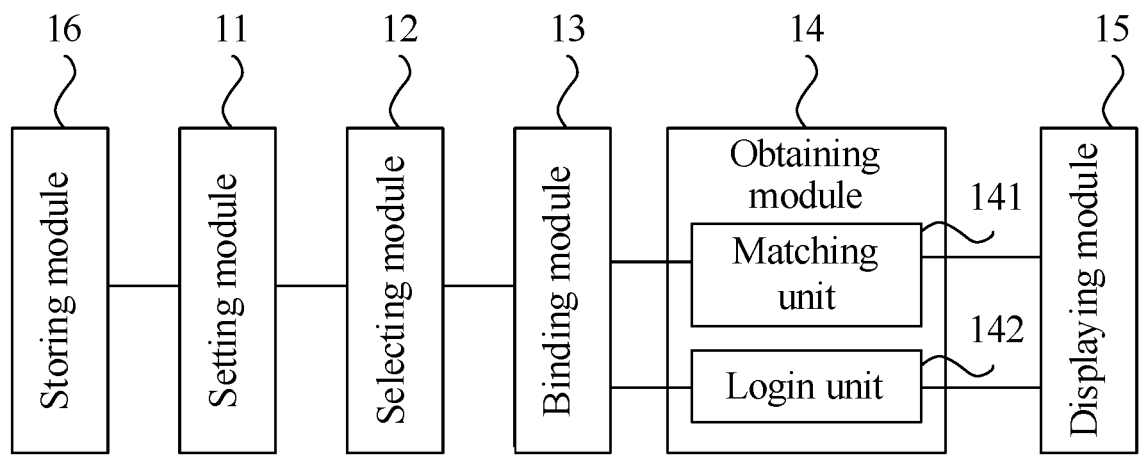
FIG. 4 shows a structure of the wireless terminal according to another embodiment of the present disclosure.

FIG. 4 shows a structure of the wireless terminal according to another embodiment of the present disclosure. As shown in FIG. 4, the wireless terminal includes a setting module 11, a selecting module 12, a binding module 13, an obtaining module 14, and a displaying module 15. The setting module 11 is configured to set a contact list on the display. The selecting module 12 is configured to select a contact from the contact list set by the setting module 11. The binding module 13 is configured to bind the contact selected by the selecting module 12 to the specific area of the display. The obtaining module 14 is configured to obtain service information corresponding to the selected contact bound to the binding module 13. The displaying module 15 is configured to display the service information obtained by the obtaining module 14 on the specific area of the display.

Further, the wireless terminal provided in this embodiment includes a storing module 16 configured to store the contact, where the contact includes a mobile communication number and at least one of an instant communication number, a web log address, an Email address, and an online shop address corresponding to the mobile communication number. The obtaining module 14 may include a matching unit 141 and a login unit 142. The matching unit 141 is configured to match the wireless terminal identifier of the sender carried in received SMS information or MMS information with the mobile communication number of the contact, and send the SMS information or the MMS information to the displaying module 15 if the matching succeeds, or match the Email identifier of the sender carried in received Email information with the Email address, and send the Email information to the displaying module 15 if the matching succeeds. The login unit 142 is configured to log in to a website corresponding to the instant communication number, the web log address, and the online shop address periodically, obtain the dynamically updated information corresponding to the instant communication number, web log address, and online shop address, and send the dynamically updated information to the displaying module 15.

The principle for implementing the wireless terminal provided in this embodiment is the same as that for implementing the method for processing contact information shown in FIG. 2, and is not further described.

Using the wireless terminal provided in this embodiment, the contact stored in the storing module 16 is set on the display to form a contact list, a contact is selected from the contact list and bound to the specific area of the display such that different information about the contact can be displayed on the specific area of the display using the displaying module 15, the obtaining module 14 actively obtains the service information corresponding to the contact such that the user can obtain information about the concerned contact in time using the wireless terminal, for example, whether a short message is received from the contact, whether the Blog of the contact is updated, and whether new commodities are available on the online shop of the contact, the obtained service information is displayed on the specific area of the display such that the user can easily and quickly read the information about the concerned contact on the specific area of the display on the wireless terminal.

Although the present disclosure has been described through some exemplary embodiments, the disclosure is not limited to such embodiments. It would be apparent that those skilled in the art can make various modifications and variations to the disclosure without departing from the spirit and scope of the disclosure.

The invention claimed is:

1. An electronic device, comprising:
   a display;
   a processor coupled to the display; and
   a memory coupled to the processor and configured to store instructions that, when executed by the processor, cause the electronic device to:
   display a list of contacts on the display;
   receive a first input for selecting a first contact from the list of contacts;
   subsequent to receiving the first input, bind the first contact to a first area of the display;
   display, at the first area of the display based on the first contact being bound to the first area, first content corresponding to the first contact;
   obtain updated first content corresponding to the first contact from a network service, wherein the updated first content is generated by the first contact and is received by the network service from the first contact before being obtained by the electronic device; and
   display the updated first content on the display.

2. The electronic device of claim 1, wherein the first content and the updated first content comprise messages.

3. The electronic device of claim 1, wherein the first content and the updated first content comprise images.

4. The electronic device of claim 1, wherein the instructions further cause the electronic device to log into a first location of the network service to obtain the updated first content.

5. The electronic device of claim 1, wherein a first location of the first area is changeable by a user.

6. The electronic device of claim 1, wherein a first location of the first content is changeable by a user.

7. The electronic device of claim 1, wherein the instructions further cause the electronic device to:
receive a first message corresponding to the first contact; and
display the first message together with the first content responsive to receiving the first message.

8. The electronic device of claim 7, wherein the first message is displayed in a second area of the display, and wherein a size of the second area is determined according to a size of the first message.

9. The electronic device of claim 7, wherein the instructions further cause the electronic device to:
obtain a second message corresponding to the first contact from the network service; and
display the second message in a third area of the display, wherein a size of the third area is determined according to a size of the second message.

10. The electronic device of claim 1, wherein the first contact is a contact in a first messaging application.

11. The electronic device of claim 1, wherein the instructions further cause the electronic device to:
receive a second input for selecting a second contact from the list of contacts;
bind the second contact to a second area of the display; and
display second content corresponding to the second contact on the display.

12. The electronic device of claim 11, wherein the instructions further cause the electronic device to:
obtain updated second content corresponding to the second contact from the network service; and
display the updated second content on the display.

13. The electronic device of claim 12, wherein the instructions further cause the electronic device to log into a second location of the network service to obtain the updated second content corresponding to the second contact.

14. The electronic device of claim 11, wherein the instructions further cause the electronic device to:
obtain a second message corresponding to the second contact; and
display the second message together with the second content.

15. The electronic device of claim 14, wherein the second message is displayed in a third area of the display, and wherein a size of the third area is determined according to a size of the second message.

16. The electronic device of claim 11, wherein a second location of the second area is changeable by a user.

17. The electronic device of claim 11, wherein the second contact is a contact of a second messaging application.

18. A method, comprising:
displaying a list of contacts on a display;
receiving a first input for selecting a first contact from the list of contacts;
subsequent to receiving the first input, binding the first contact to a first area of the display;
displaying, at the first area of the display based on the first contact being bound to the first area, first content corresponding to the first contact;
obtaining updated first content corresponding to the first contact from a network service, wherein the updated first content is generated by the first contact and is received by the network service from the first contact; and
displaying the updated first content on the display.

19. The method of claim 18, further comprising logging into a first location of the network service to obtain the updated first content.

20. The method of claim 18, wherein a first location of the first area is changeable by a user.

21. The method of claim 18, wherein a first location of the first content is changeable by a user.

22. The method of claim 18, further comprising:
obtaining a first message corresponding to the first contact; and
displaying the first message together with the first content.

23. The method of claim 22, wherein the first message is displayed in a second area of the display, and wherein a size of the second area is determined according to a size of the first message.

24. The method of claim 22, further comprising:
obtaining a second message corresponding to the first contact from the network service; and
displaying the second message in a third area of the display, wherein a size of the third area is determined according to a size of the second message.

25. The method of claim 18, wherein the first contact is a contact in a first messaging application.

26. The method of claim 18, further comprising:
receiving a second input for selecting a second contact from the list of contacts;
binding the second contact to a second area of the display; and
displaying second content corresponding to the second contact on the display.

27. The method of claim 26, further comprising:
obtaining updated second content corresponding to the second contact from the network service; and
displaying the updated second content on the display.

28. The method of claim 27, further comprising logging into a second location of the network service to obtain the updated second content corresponding to the second contact.

29. The method of claim 26, further comprising:
obtaining a second message corresponding to the second contact; and
displaying the second message together with the second content.

30. The method of claim 29, wherein the second message is displayed in a third area of the display, and wherein a size of the third area is determined according to a size of the second message.

31. The method of claim 26, wherein a second location of the second area is changeable by a user.

32. The method of claim 26, wherein the second contact is a contact of a second messaging application.

33. A computer program product comprising instructions stored on a non-transitory computer-readable medium that, when executed by a processor, cause an electronic device to:
display a list of contacts on a display;
receive a first input for selecting a first contact from the list of contacts;
subsequent to receiving the first input, bind the first contact to a first area of the display;
display, at the first area of the display based on the first contact being bound to the first area, first content corresponding to the first contact;

obtain updated content corresponding to the first contact from a network service, wherein the updated content is generated by the first contact and is received by the network service from the first contact before being obtained by the electronic device; and display the updated content on the display.

\* \* \* \* \*